(12) United States Patent
Curewitz et al.

(10) Patent No.: US 10,761,781 B2
(45) Date of Patent: *Sep. 1, 2020

(54) APPARATUS AND METHODS FOR A DISTRIBUTED MEMORY SYSTEM INCLUDING MEMORY NODES

(71) Applicant: MICRON TECHNOLOGY, INC., Boise, ID (US)

(72) Inventors: Kenneth M. Curewitz, Cameron Park, CA (US); Sean E. Eilert, Penryn, CA (US)

(73) Assignee: Micron Technology, Inc., Boise, ID (US)

( * ) Notice: Subject to any disclaimer, the term of this patent is extended or adjusted under 35 U.S.C. 154(b) by 112 days.

This patent is subject to a terminal disclaimer.

(21) Appl. No.: 16/132,099

(22) Filed: Sep. 14, 2018

(65) Prior Publication Data

US 2019/0042100 A1  Feb. 7, 2019

Related U.S. Application Data

(62) Division of application No. 13/842,984, filed on Mar. 15, 2013, now Pat. No. 10,089,043.

(51) Int. Cl.
   *G06F 12/00* (2006.01)
   *G06F 3/06* (2006.01)

(52) U.S. Cl.
   CPC .............. *G06F 3/067* (2013.01); *G06F 3/061* (2013.01); *G06F 3/0635* (2013.01)

(58) Field of Classification Search
   None
   See application file for complete search history.

(56) References Cited

U.S. PATENT DOCUMENTS 5,134,711 A    7/1992  Asthana et al.
5,590,370 A   12/1996  Asthana et al.
(Continued)

FOREIGN PATENT DOCUMENTS

CN   102708073 A   10/2012
JP   2011060278 A   3/2011
(Continued)

OTHER PUBLICATIONS

English Translation of Third Office Action dated Jul. 13, 2018 for Chinese application 201480015701.0, pp. all.
(Continued)

*Primary Examiner* — Daniel D Tsui
(74) *Attorney, Agent, or Firm* — Dorsey & Whitney LLP (57) ABSTRACT

Apparatuses and methods for a distributed memory system including memory nodes are disclosed. An example apparatus includes a processor and a memory system coupled to the processor. The memory system is configured to receive instructions from the processor to access information stored by the memory system. The memory system includes a plurality of memory nodes, wherein each memory node of the plurality of memory nodes is coupled to at least one other memory node of the plurality of memory nodes, and each memory node of the plurality of memory nodes is configured to generate an internal message including instructions for an operation, the internal message to be provided to another memory node of the plurality of memory nodes to perform the operation.

20 Claims, 5 Drawing Sheets

(56) References Cited

U.S. PATENT DOCUMENTS

| | | | |
|---|---|---|---|
| 7,242,216 | B1 | 7/2007 | Schmit et al. |
| 7,536,528 | B2 | 5/2009 | Wallner et al. |
| 7,581,080 | B2 | 8/2009 | Beaumont |
| 7,623,365 | B2 | 11/2009 | Jeddeloh |
| 7,913,033 | B2 | 3/2011 | Roohparvar |
| 7,987,205 | B1 | 7/2011 | Depelteau |
| 8,407,516 | B2 | 3/2013 | Swanson et al. |
| 2005/0108203 | A1 | 5/2005 | Tang et al. |
| 2009/0024688 | A1 | 1/2009 | Wilson et al. |
| 2010/0161914 | A1 | 6/2010 | Eilert et al. |
| 2010/0211721 | A1 | 9/2010 | Resnick |
| 2010/0241783 | A1 | 9/2010 | Garcia et al. |
| 2011/0016293 | A1 | 1/2011 | Thonnart |
| 2011/0066796 | A1* | 3/2011 | Eilert .................. G06F 3/06 711/105 |
| 2011/0067039 | A1 | 3/2011 | Eilert et al. |
| 2011/0307433 | A1 | 12/2011 | Dlugosch |
| 2011/0307503 | A1 | 12/2011 | Dlugosch |
| 2012/0054452 | A1 | 3/2012 | Kumar et al. |
| 2012/0117354 | A1 | 5/2012 | Tatsumura et al. |
| 2013/0054727 | A1 | 2/2013 | Kumano et al. |
| 2014/0281278 | A1 | 9/2014 | Curewitz et al. |

FOREIGN PATENT DOCUMENTS

| | | | |
|---|---|---|---|
| JP | 2011060279 | A | 3/2011 |
| JP | 2012103926 | A | 5/2012 |
| WO | 2014149278 | A1 | 9/2014 |

OTHER PUBLICATIONS

European Examination Report dated Feb. 7, 2018 for European Application No. 14767990.6; pp. all.
First Office Action dated Jul. 27, 2015 received for TW Application No. 103106541; pp. all.
Fourth office action dated Aug. 16, 2017 for Taiwan application No. 103106541; pp. all.
International Search report & Written opinion dated Jun. 3, 2014 received for Appln No. PCT/US2014/016585; pp. all.
JP Office Action dated Dec. 6, 2016 for JP Appl. No. 2016-500270; pp. all.
Second Office Action dated Feb. 14, 2018 for Chinese Application No. 201480015701.0; pp. all.
"Distributed hash table—Wikipedia, the free encyclopedia," retrieved from Internet Oct. 14, 2016: https://web.archive.org/web/20121224130527/en.wikipedia.org/wiki/Distributed_hash_table.
Extended European Search Report for EP14767990 dated Sep. 22, 2016, pp. all.
Notice of Final Rejection for KR Appl. No. 10-2015-7028640 dated Jan. 5, 2017; pp. all.
Notice of Preliminary Rejection (Non-Final) for Korean Patent Application No. 10-2015-7028640 dated Aug. 5, 2016; pp. all.
Notice of Second Final Rejection for KR Appl. No. 10-2015-7028640 dated Apr. 11, 2017; pp. all.
First Office Action dated Apr. 19, 2017 for Chinese application No. 201480015701.0; pp. all.
Second office action received for Application No. 103106541 dated Mar. 18, 2016; pp. all.
Third office action received for TW Application No. 103106541 dated Mar. 8, 2017; pp. all.
EPO Communication pursuant to Article 94(3) for EP application No. 14767990.6 dated Nov. 27, 2018, pp. all.

* cited by examiner

APPARATUS AND METHODS FOR A
DISTRIBUTED MEMORY SYSTEM
INCLUDING MEMORY NODES

CROSS-REFERENCE TO RELATED APPLICATION

This application is a divisional of U.S. patent application Ser. No. 13/842,984, filed Mar. 15, 2013 and U.S. Pat. No. 10,089,043 on Oct. 2, 2018. The aforementioned application and patent are incorporated herein by reference, in their entirety, for any purpose.

BACKGROUND OF THE INVENTION

The processing power of computing platforms is increasing with the increase in the number of cores and the number of threads on computing platforms. This increase in processing power leads to a corresponding increase in the demands placed on system memory. For example, read and write operations to system memory increase as the core and thread count increase. There is a risk that memory accesses will become a substantial performance bottleneck for computing platforms. For example, in traditional computer architectures, the CPU to memory interface may pose a significant bottleneck, such as for bulk memory operations. That is, a bottleneck may be created as a result of the CPU controlling every transaction to, from, and within the memory system for performing operations on information stored by the memory system.

DETAILED DESCRIPTION

Certain details are set forth below to provide a sufficient understanding of embodiments of the invention. However, it will be clear to one skilled in the art that embodiments of the invention may be practiced without these particular details. Moreover, the particular embodiments of the present invention described herein are provided by way of example and should not be used to limit the scope of the invention to these particular embodiments. In other instances, well-known circuits, control signals, timing protocols, and software operations have not been shown in detail in order to avoid unnecessarily obscuring the invention.

Figure 1:
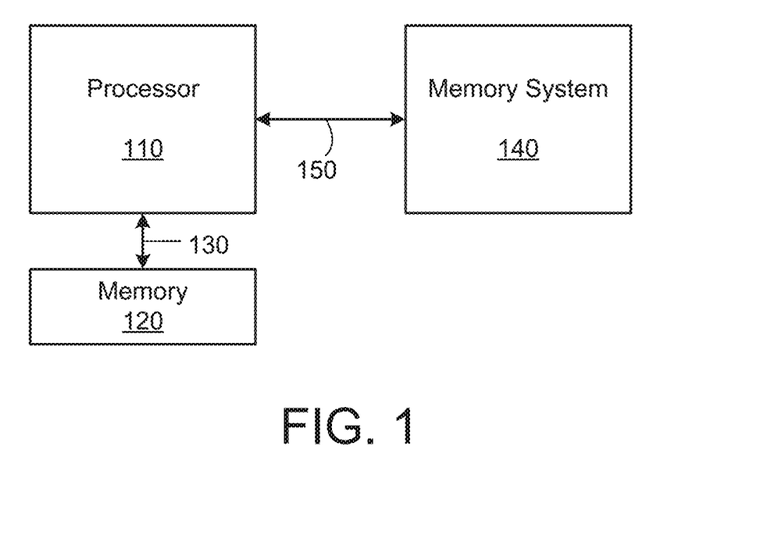
FIG. 1 is a block diagram of an apparatus including, a memory system according to an embodiment of the invention.

FIG. 1 illustrates an apparatus including a processing system 100 according to an embodiment of the invention. The processing system 100 includes a processor 110 coupled to a memory 120 through a local memory bus 130. As used herein, "processor" may refer to a central processing unit CPU, graphics processing unit GPU, system controller, memory controller, etc. The processor 110 may represent one or more processors. The processor 110 may use the memory 120 for storing information; for example, programs, instructions, and/or data that may be desirable to be accessed by the Processor 110 quickly. The processing system 100 further includes a memory system 140 with which the processor 110 communicates over a memory bus 150. The memory system 140 may be used to store relatively large amounts of information, for example, large sets of programs, instructions, and/or other information.

The information stored by the memory system 140 may be accessed by the processor 110 providing messages that are received by the memory system 140. The messages may include information, for example, instructions and/or data for the memory system 140. The messages may additionally or alternatively include information related to the source memory node, destination memory, as well as the operation to be performed. The memory system 140 may carry out operations according to the instructions included in the messages provided by the processor 110. The memory system 140 may provide messages to the processor 110 responsive to the messages received from the processor 110. For example, the memory system 140 may receive from the processor 110 a message including instructions to read information from the memory system 140. Responsive to the message from the processor 110, the memory system 140 may perform a read operation and provide a message to the processor 110 including the information that was read. In another example, the memory system 140 may receive from the processor 110 a message including instructions for writing information to the memory system 140, and further including the information to be written. Responsive to the message from the processor 110, the memory system 140 may perform a write operation to write the information to memory. The memory system 140 may provide a message including an acknowledgment of completion of the write instructions to the processor 110. messages including various other types of instructions, data, and/or other information may be received and provided by the memory system 140 and processor 110 as well.

In some embodiments, the memory system 140 may be, or includes, a memory system including a plurality of memory nodes. The memory nodes may be configured to provide information (e.g., instructions, data, etc.) between the memory nodes, for example, to carry out an operation responsive to receiving a message from the processor 110. The memory system 140 may represent a distributed memory system having a plurality of memory nodes communicatively coupled together through a communication network. With such memory systems, instructions for higher level memory operations may be available. Such operations may be managed among the nodes of the memory system 140 with little to no involvement by the processor 110. A benefit of a memory system 140 as described may be to reduce transactions between the memory system 140 and the processor 110 over the memory bus 150, which may be considered a "bottleneck" for the operability of the processing system 100. Reducing the transactions between the memory system 140 and the processor 110 may result in improved performance of the processing system 100 because less time may be devoted by the processor 110 managing memory operations and less time may be wasted by the processor 110 performing computational operations on information provided by the memory system 140.

Figure 2:
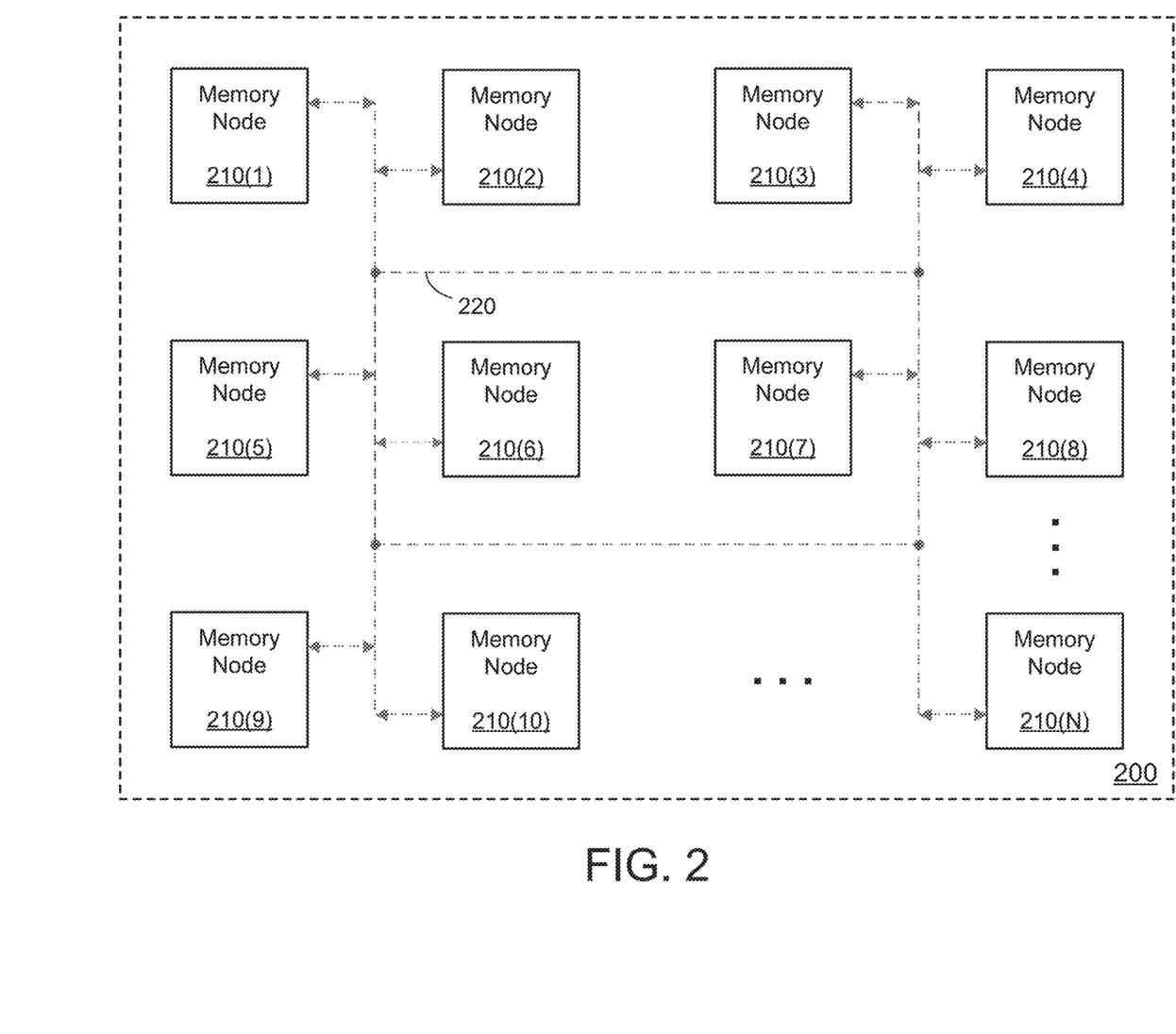
FIG. 2 is a block diagram of a memory system according to an embodiment of the invention.

FIG. 2 illustrates a memory system 200 according to an embodiment of the invention. The memory system 200 may be included in the memory system 140 of the processing system 100 of FIG. 1. The memory system 200 includes a plurality of memory nodes 210(1)-(N). The memory nodes 210(1)-(N) may be communicatively coupled together so that a memory node may communicate with at least one other memory node of the memory system 200. For example, a communication network 220 may be used to communicatively couple together the memory nodes 210(1)-(N). In some embodiments, the memory nodes 210(1)-(N) may be configured to communicate by exchanging messages (e.g., packets) with another memory node 210(1)-(N) over the communication network 220. The messages exchanged between the memory nodes 210(1)-(N) may be implemented using various known or later developed messaging technologies. For example, the memory node 210(1) may be able to provide packets to one, several, or any of the other memory nodes 210(2)-(N) of the memory system 200. In this manner, packets may be efficiently provided and received between the memory nodes 210 of the memory system 200. Although communication between the nodes as described herein is made with reference to packets, it will be appreciated other forms of messages may be used without departing from the scope of the present invention.

The memory nodes 210 may be communicatively coupled through wired and/or wireless communication mediums. Communication between the memory nodes 210 may utilize known communication protocols, for example, the Transmission Control Protocol/Internet Protocol (TCP/IP). Where wireless communication is utilized, the memory nodes 210 include wireless communication circuitry suitable for communicating between the memory nodes 210. Likewise, where wired communication is utilized, the memory nodes 210 include wired communication circuitry suitable for communicating between the memory nodes 210.

Packets including instructions and/or data may be received from outside of the memory system 200, for example, from processor 110 as described with reference to FIG. 1. The packets are provided to one or more of the memory nodes 210(1)-(N), which perform operations based on the instructions and/or data. For example, operations may include a read operation, a write operation, key search, addition and/or deletion of information of a data structure, updating fields in a data structure, etc.

As will be described in more detail below, a memory node 210 may include local memory for storing information (e.g., data, instructions, etc.), and may include logic and/or processing capability configured to perform computational operations responsive to packets it receives. Examples of computational operations may include Boolean logic operations, arithmetic operations, comparison operations, as well as other computational operations. A memory node 210 may further include logic and/or memory control capability configured to control operation of the local memory, as well as generate packets that may be provided to other memory nodes 210 or provided externally from the memory system 200, for example, to processor 110. The packets generated by a memory node 210 may include instructions and/or data, which can cause receiving memory nodes 210 to perform operations based on the instructions and/or data. The packets may further include source and destination information for the memory nodes.

As will be described in more detail below, when a memory node receives a packet, the memory node may perform local operations (e.g., memory operations, computational operations, etc.) on information stored by local memory of the memory node. Based on the results of the local operations, the operations may be completed, or in some instances, incomplete. When operations require additional information and/or processing outside the memory node, the memory node may rely on another memory node of the memory system for the additional information and/or processing. For example, the memory node may determine a destination memory node for a next operation or operations, determine the source for the next operation or operations, and generate a packet or packets that may include various information, such as information related to the source memory node, the destination memory, the operation, and/or data. The packet is provided from the memory node to another memory node or memory nodes.

By exchanging packets between the memory nodes to communicate, transactions between the memory system 200 and a processor 110 may be reduced as operations by the memory nodes 210(1)-(N) may be performed, as previously discussed, based on instructions and/or data included in packets generated by memory nodes within the memory system 200. As described herein, "external" packets (which are examples of "external" messages) may be received by the memory system, or provided by the memory system, and "internal" packets (which are examples of "internal messages") may be provided between the memory nodes. Internal packets may be the same or similar to the external packets. For example, the format of the internal packets and external packets may be similar. In some embodiments, the internal packets may be different than external packets, for example, the internal packets may include additional information to communicate between the memory nodes, have a different format than the external packets, etc.

Figure 3:
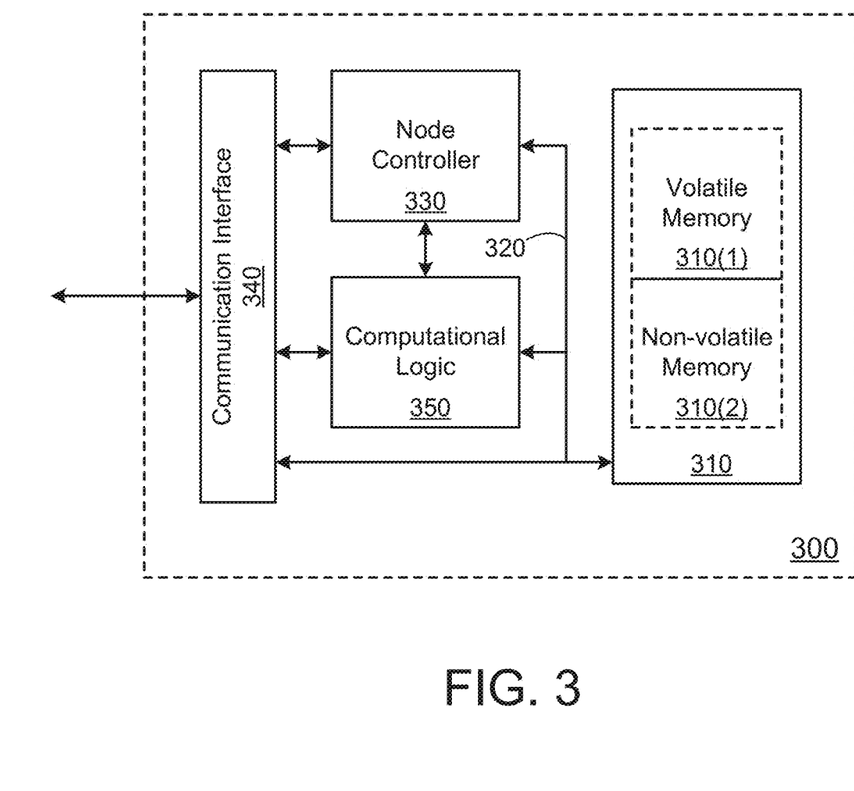
FIG. 3 is a block diagram of a memory node according to an embodiment of the invention.

FIG. 3 illustrates a memory node 300 according to an embodiment of the invention. The memory node 300 includes a local memory 310 coupled to a bus 320. The bus 320 is configured to provide communications between the blocks included in the memory node 300. The local memory 310 may include different types of memory, for example, the local memory 310 may include volatile memory 310(1) and non-volatile memory 310(2). The local memory 310 may be configured to store and provide information associated with the memory node 300.

A node controller 330 coupled to the bus 320 may be configured to control operations of the memory node 300. The node controller 330, for example, may provide instructions over the bus 320 to control the local memory 310 to perform various memory operations, such as to read information from the memory or to store information in the memory. The node controller 330 may control computational logic that may be configured to perform computations on information, such as information stored in the local memory 310 and/or provided to the memory node 300. The node controller 330 may control a communication interface 340 that may be configured to provide communications with the memory node 300, such as communicating with another memory node and/or a processor (e.g., processor 110). The communication interface 340 is further coupled to the bus 320, which allows for communication with the local memory 310 as well. The memory node 300 may be configured to communicate over wired and/or wireless mediums, including circuitry for such communications. For example, the communication interface 340 may include circuitry that is configured for wired communication with other memory nodes, and the communication interface may alternatively or additionally include circuitry that is configured for wireless communication with other memory nodes.

As previously discussed, packets provided to a memory node may include information, such as instructions and data. Responsive to receiving packets, the node controller 330 may control the local memory 310 and/or the computational logic 350 to perform memory operations and computational operations. For example, a packet received by the memory node 300 may include instructions to perform a write operation, and further include information to be stored in the local memory 310 according to the write operation. The node controller 330 may generate control signals for the local memory 310 to store the information included with the packet. In other examples, a packet received by the memory node 300 may include instructions to perform a computational operation on information stored by the local memory 310. The node controller 330 may generate control signals for the local memory 310 and the computational logic 350 to access the information stored in the local memory 310 and perform the computational operation. Examples of computational operations may include Boolean logic operations, arithmetic operations, comparison operations, as well as other computational operations.

As will be further described below, the node controller 330 may be further configured to generate packets that may be provided to other memory nodes, as well as packets that may be provided external to a memory system including the memory node 300. The node controller 330 may determine a destination for the packets (e.g., a receiving memory node or receiving memory nodes). The destination may be determined based on, for example, the information, the memory operation, or a combination of both. The packets generated by the node controller 330 may include instructions for other memory nodes to perform operations. The packets may alternatively or additionally include information for the other memory node. Thus, a memory node may locally determine a destination node for a packet that is generated internally to the memory system, and the packet generated may be based on the results of local processing at the memory node.

Including the memory node 300 in a memory system, such as the memory system 200, may reduce the number of memory transactions with the memory system. Instructions issued by the processor in effect go to the information (stored in the memory system), rather than having the information come to the processor, which may place significant operational burden on the processor while leaving memory system bandwidth unutilized. As a result of having a memory system that may be configured to control operations internally among memory nodes and with less intervention by the processor, operational efficiency of a processing system may be improved.

Figure 4:
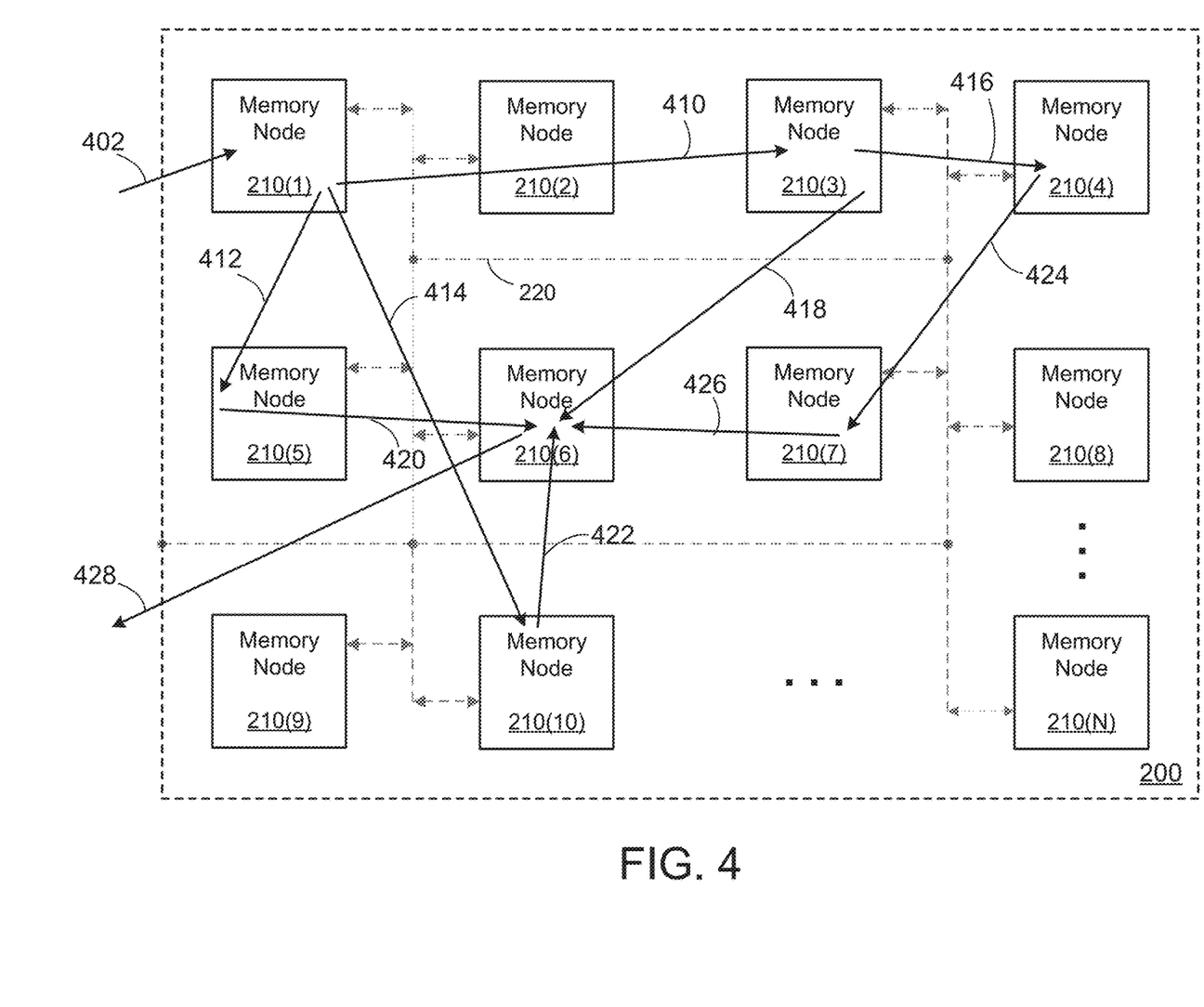
FIG. 4 is a block diagram of an example operation of a memory system according to an embodiment of the invention.

FIG. 4 illustrates a diagram of an example operation of a memory system according to an embodiment of the invention. The example of FIG. 4 is related to receipt by a memory system according to an embodiment of the invention (e.g., the memory system 200 of FIG. 2) of a packet including a memory request. The packet may be received from, for example, a processor, such as the processor 110 of FIG. 1, and will be referred to as an "external" packet. In the example of FIG. 4, the memory request is for the receiving memory system to find and provide information related to a "key" identified in the external packet.

The external packet is received by memory node 210(1) to request information related to the key, as illustrated in FIG. 4 by arrow 402. A node controller of the memory node 210(1) may perform operations responsive to the external packet, for example, operations to access the information stored in local memory and determine whether information related to the key is present within local memory of the memory node 210(1). For example, the node controller of the memory node 210(1) may provide memory commands to the local memory of the memory node 210(1) to provide stored information from the local memory for comparison by computational logic to determine whether any information satisfying the request is stored in the local memory of the memory node 210(1), that is, whether any stored information matches the key.

In addition to the operations performed by the node controller and computational logic of the memory node 210(1), the memory node 210(1) (e.g., a "sending" memory node) determines that packets (e.g., "internal packets) should be provided to other memory nodes (e.g., "receiving" memory nodes) of the memory system 200. The node controller of the memory node 210(1) determines the receiving nodes for the internal packets, and as shown in FIG. 4, the memory node 210(1) provides internal packets to memory nodes 210(3), 210(5), and 210(10), as illustrated in FIG. 4 by the arrows 410, 412, and 414, to continue the request for information.

The internal packets provided by the memory node 210(1) may include instructions for requests for information, for example, to continue the search for information matching the key that may be stored by the local memory of the other memory nodes. The internal packets may alternatively or additionally include information, for example, information identified during the operations performed by the sending memory node as matching the key. The internal packet provided by the memory node 210(1) may include some or all of the information (e.g., instructions, data, etc.) from the external packet it received (e.g., represented by arrow 402). The internal packet provided by the memory node 210(1) may include information that are not included in the external packet the memory node 210(1) received. For example, the internal packet may include information generated by the node controller and the computational logic of the memory node 210(1) that was not included in the external packet. The information may assist the receiving memory nodes in performing operations, for example, to satisfy the request for information associated with the external packet.

The receipt of an internal packet from a sending memory node, the performance of an operation responsive to the internal packet, and/or providing an internal packet by the receiving memory node to another memory node (e.g., the "receiving" memory node becomes a new "sending" memory node) may continue throughout the memory system 200. For example, responsive to the internal packet provided by the memory node 210(1) to the memory node 210(3) (e.g., arrow 410), the node controller and computational logic of the memory node 210(3) may perform operations such as searching its local memory for information satisfying the initial request to the memory 200. The node controller of the memory node 210(3) may additionally generate additional internal packets, which may include information, for example, instructions related to the initial request to the memory 200 and/or data identified in the local memory of the memory node 210(3) satisfying the initial request. The internal packets are provided by the memory node 210(3) to memory nodes 210(4) and 210(6) (e.g., as represented by arrows 416 and 418, respectively).

As further illustrated in FIG. 4, the internal packet from the memory node 210(3) to the memory node 210(4) results in the generation of another internal packet by the memory node 210(4) that is provided to the memory node 210(7) (as represented by arrow 424), and in response, the memory node 210(7) generates and provides an internal packet to the memory node 210(6) (as represented by arrow 426). Likewise, the memory node 210(10), which received an internal packet from the memory node 210(1) (as represented by the arrow 414) generates and provides an internal packet that is provided to the memory node 210(6) (as represented by the arrow 422). The memory node 210(5), which received an internal packet from the memory node 210(1) (as represented by the arrow 412) generates and provides an internal packet that is provided to the memory node 210(6) (as represented by the arrow 420).

As previously discussed, receipt of an internal packet from a sending memory node may cause a receiving memory node to perform operations related to instructions and/or data included in the internal packet received, for example, searching the local memory of the receiving memory node for information. Additionally, the receiving memory node may generate an internal packet that includes instructions and/or data to be provided to another memory node. The internal packet that is generated by the receiving memory node (which then becomes a sending memory node) may include instructions and/or data for the new receiving memory node.

A memory node 210(6) receives internal packets from memory nodes 210(3), 210(5), 210(7), and 210(10), as illustrated in FIG. 4 by arrows 418, 420, 426, and 422, respectively. The internal packets from the memory nodes may include information identified by the node controller and computational logic of the respective memory nodes that satisfy memory requests included in the respective internal packet the memory node received from a sending memory node. For example, the internal packets from the memory nodes (e.g., 210(3), 210(5), 210(7), and 210(10)) may include instructions for the memory node to perform operations, for example, related to the initial request for information associated with the external packet received by the memory system 200 (e.g., represented in FIG. 4 by arrow 402). In the example of FIG. 4, the memory node 210(6) may aggregate the information from the other memory nodes (e.g., sending memory nodes) that was identified by the respective memory node as satisfying the initial request for information, such as the data identified by the memory nodes that match the key.

In the example of FIG. 4, based on the internal packets received from the sending memory nodes, node controller of the memory node 210(6) generates an internal packet including information provided to it from the other memory nodes. The internal packet is provided external to the memory system 200 (as represented by arrow 428), for example, to a processor from which the memory system 200 received the external packet represented by the arrow 402. The internal packet provided by the memory node 216(6) may include information from the memory system 200 that collectively satisfies the request for information, that is, information related to the key of the external packet initially received by 210(1).

As illustrated by the example of FIG. 4, the memory system 200 may manage operations internally responsive to an external packet received by the memory system 200. For example, memory nodes 210(1)-(N) of the memory system 200 may provide internal packets generated by a node controller of the sending memory node to other memory nodes of the memory system 200. The internal packets may include information (e.g., instructions and/or data) for the receiving memory node to perform operations to satisfy an operation associated to an external packet received by the memory system 200. At the completion by the memory system 200 of the operation associated with the external packet, an external packet may be provided by the memory system 200.

Figure 5:
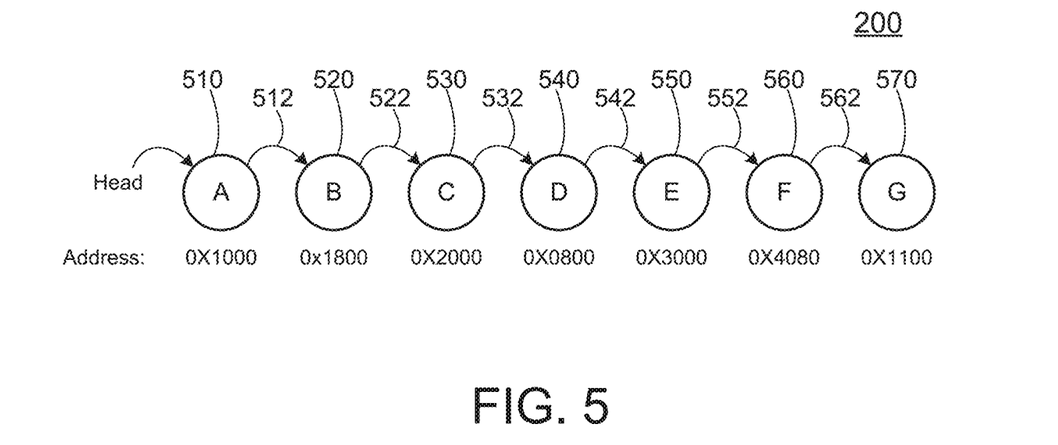
FIG. 5 is a diagram of a linked data structure.

FIG. 5 illustrates a data structure 500 for a linked list data set that may be searched according to an embodiment of the invention. The data structure 500 represents information linked together to form a larger set of data including information associated with keys "A," "B," "C," "D," "E," "F," and "G." In particular, the data structure 500 includes data subsets 510-570 linked together by pointers to form a larger data set. Each of the data subsets 510-570 includes information associated with a respective key. A "head" of the data structure 500 is associated with data subset 510, which is located at address 0x1000 and includes information associated with a key "A." A pointer 512 in the data subset 510 points to data subset 520, which is located at address 0x1080 and includes information associated with a key "B," thereby linking the data subsets 510 and 520. Likewise, subset 530 located at address 0x2000 and including information associated with a key "C" is linked to data subset 520 by a pointer 522. Data subsets 540, 550, 560, and 570 at addresses 0x0800, 0x3000, 0x4080, and 01100, and including information associated with keys "D," "E," "F," and "G," all respectively, are similarly linked to data subset 530 and to one another by pointers 532, 542, 552, and 562 that point from one data subset to another.

In a conventional system, to search the data structure 500 for information matching a search key "E," a CPU, for example, sets a current search pointer to the head of the data structure 500 associated with the data subset 510 at address 0x1000. The CPU issues a memory read instruction to read information from the current location identified by the pointer and compares the information read from the current location to the search key "E." If the information read from the current location matches the search key "E," then the search is completed and terminated. However, if the information from the current location does not match the search key "E," the CPU advances the search pointer to a next location, which then becomes the current location.

As before, the CPU issues a memory read instruction to read information from the (new) current location identified by the pointer and compares the information read from the current location. The steps of pointing to a new current location, reading information from the current location, and comparing the information to the search key "E," is repeated until the information is found, or the entire data structure 500 has been searched but no information is found, at which time the search is terminated. In the example data structure 500 of FIG. 5, the data subset 550 includes information matching the search key "E." As a result, the CPU will read information at data subsets 510, 520, 530, and 540, linked together by pointers 512, 522, and 532, until reading the information from the data subset 550 (linked by pointer 542) and determining that the information matches the search key "E," at which time the CPU terminates the search.

In the example for the conventional system, the CPU is burdened with issuing the memory read instructions, comparing the information read from a current location to the search key, and terminating the search upon completion.

Figure 6:
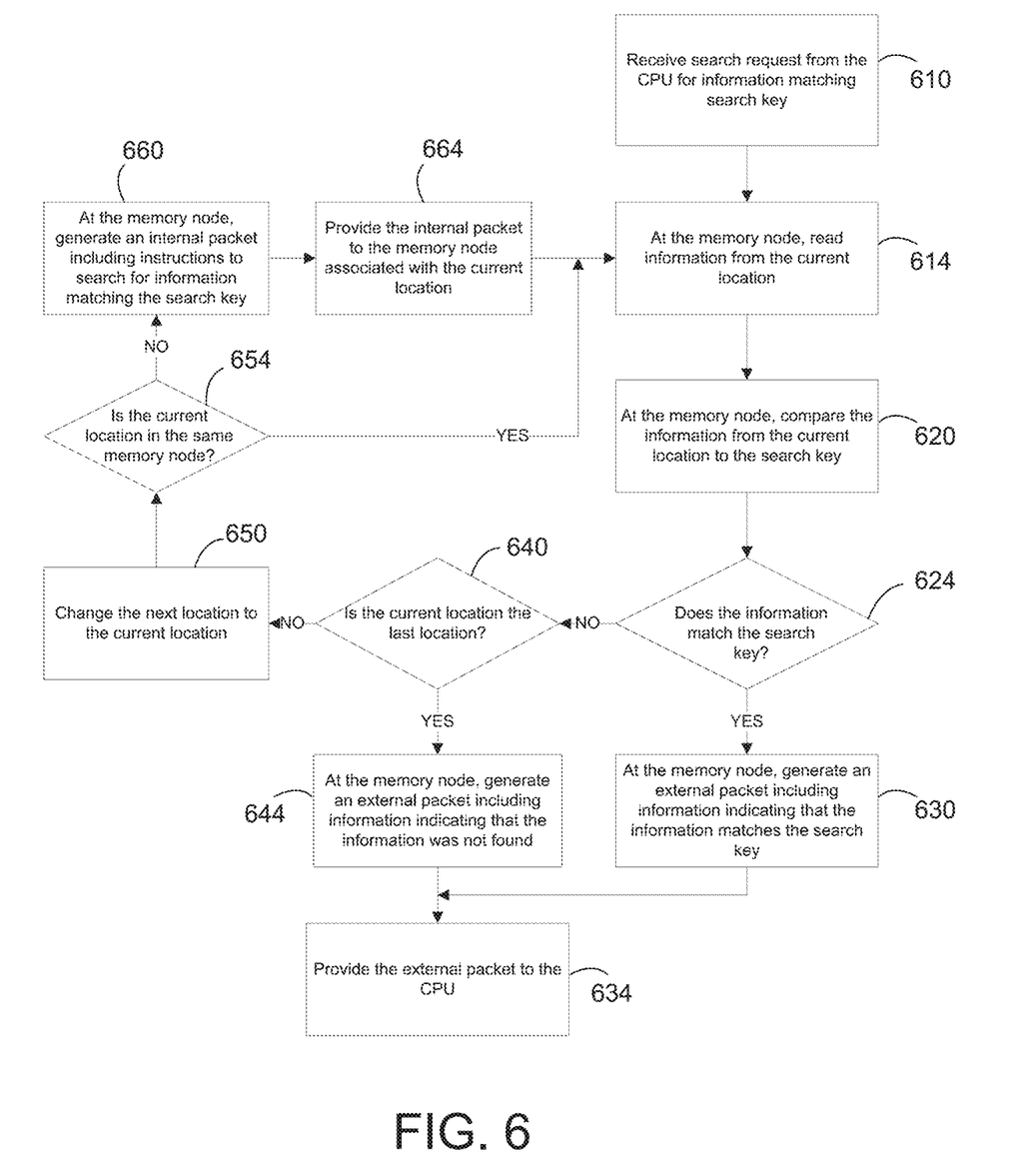
FIG. 6 is a flow diagram of an example operation of a memory system according to an embodiment of the invention.

FIG. 6 illustrates a flow diagram for searching the data structure 500 for a memory system according to an embodiment of the invention. The data structure 500 may be searched for information based on the CPU issuing a single instruction to the memory system. The reading of information from a current location and comparing the information to a search key is managed internally to the memory system, in particular, by the memory nodes of the memory system. For the purposes of the present example, each of the data subsets of the data structure 500 are stored by a respective memory node of a memory system including a plurality of memory nodes according to an embodiment of the invention, for example, the memory node 210 (FIG. 2) and/or the memory node 300 (FIG. 3).

At step 610, the memory system receives an instruction from the CPU for searching the data structure 500 to find information matching a search key (e.g., search key "E"), beginning with the head of the data structure 500, in particular the data subset 510 at address 0x1000. At step 614, the memory node, such as the memory node including the data subset 510, performs a read operation of a current location identified by a pointer. At step 620, the memory node compares the information read from the current location to the search key. At step 624, if the information from the current location matches the search key, then at step 630 the memory node generates an external packet including the information matching the search key and further including information indicating that the information has been found. At step 634 the external packet is provided by the memory node to the CPU.

At step 624 if the information from the current location does not match the search key (e.g., search key "E"), it is determined at step 640 whether the current location is the end (e.g., the last location) of the data structure being searched. In the event the current location is the last location, at step 644 the memory node generates an external packet including information indicating that no information matching the search key has been found. The external packet is provided by the memory node to the CPU at step 634. In the event the current location is not the last location, at step 650 the memory node advances the search pointer to a next location to change the next location to the current location. At step 654, it is determined by the memory node whether the current location is in the same memory node. If the current location is in the same memory node, the memory node begins the process of reading information from the current location (step 614), comparing the information to the search key (step 620), and determining whether the information matches the search key (step 624).

If at step 654 it is determined by the memory node that the current location is not in the same memory node, at step 660 the memory node generates an internal packet that includes instructions to search for information matching the search key (e.g., search key "E"). The internal packet is provided at step 664 to the memory node including the current location. The memory node including the current location receives the internal packet and begins the process of reading information from the current location (step 614), comparing the information to the search key (step 620), and determining whether the information matches the search key (step 624).

In contrast to searching the data structure 500 using the conventional system, in which the CPU is burdened with issuing all of the memory read instructions, comparing the information from a current location to the search key, and terminating the search upon completion, the memory read operations and comparisons are performed by the memory nodes within the memory system. From the time the CPU issues the initial search instruction to the time an external packet is provided to the CPU by the memory system, the CPU is free to perform other operations.

The memory system may include a plurality of memory nodes, wherein the memory nodes include local memory for storing information. The memory nodes may further include computational logic configured to perform operations on information, as well as include a node controller configured to control operations within the memory node and generate internal packets that may be provided to other memory nodes. The internal packets may include information for the receiving memory node, for example, instructions for operations to be performed by a receiving memory node and/or data for the receiving memory node. Embodiments of the invention may be utilized to reduce the number of memory transactions between a CPU and a memory system (e.g., processor 110 and memory system 140 of FIG. 1), and additionally reduce the burden on the CPU for managing operations on information stored by the memory system.

From the foregoing it will be appreciated that, although specific embodiments of the invention have been described herein for purposes of illustration, various modifications may be made without deviating from the spirit and scope of the invention. Accordingly, the invention is not limited except as by the appended claims.

The invention claimed is:

1. A method, comprising:
  receiving an external message at a first memory node of a memory system, the external message including a first instruction to perform a first memory operation;
  responsive to the first instruction, generating at the first memory node a first internal message including a second instruction for a second memory operation, the second instruction not included in the external message;
  providing the first internal message to a second memory node of the memory system;
  performing the second memory operation at the second memory node responsive to the first internal message;
  generating at the second memory node, a second internal message including at least one of a third instruction or the second instruction, responsive to at least one of the first internal message or the second memory operation, wherein the third instruction is not included in the external message;
  providing the second internal message to a third memory node of the memory system; and
  performing a third memory operation at the third memory node responsive to the second internal message.

2. The method of claim 1, further comprising performing the first memory operation at the first memory node.

3. The method of claim 2, wherein the first memory operation at the first memory node comprises a read operation.

4. The method of claim 1, wherein performing the second memory operation comprises accessing a local memory of the second memory node.

5. The method of claim 4, further comprising performing a computational operation at the second memory node on information read from the local memory of the second memory node responsive to the second instruction.

6. The method of claim 1, wherein a format of the internal message is different than a format of the external message.

7. The method of claim 1,
  wherein the second internal message comprises information related to the second memory operation.

8. The method of claim 1, wherein performing the second memory operation comprises performing a read operation, a write operation, key search, addition and deletion of information of a data structure, updating fields in a data structure, or combinations thereof.

9. The method of claim 1, wherein the first memory operation comprises searching for information related to a search key.

10. A method comprising:
  receiving an external message at a first memory node of a memo system, the external message including a first instruction to perform a first memory operation, wherein the first memory operation comprises searching for information related to a search key;
responsive to the first instruction, generating at the first memory node a first internal message including a second instruction for a second memory operation, the second instruction not included in the external message;
providing the second instruction to a second memory node of the memory system;
performing the second memory operation at the second memory node responsive to the second instruction; and
accessing a local memory of the first memory node to search for information related to the search key.

11. The method of claim 10, wherein generating at the first memory node the first internal message includes the second instruction to search for information related to the search key.

12. The method of claim 11, further comprising responsive to the first internal message, accessing a local memory of the second memory node to search for information related to the search key;
generating a second internal message at the first memory node including information from the local memory of the first memory node that is related to the search key;
providing the second internal message to a third memory node of the memory system;
generating a third internal message at the second memory node including information from the local memory of the second memory node that is related to the search key; and
providing the third internal message to the third memory node of the memory system.

13. The method of claim 12, further comprising generating a second external message at the third memory node including the information from the first and second memory nodes; and
providing the second external message external to the memory system.

14. The method of claim 12, wherein information stored in the local memory of the first memory node and information stored in the local memory of the second memory node are respective data subsets of a linked list data set.

15. The method of claim 14, wherein generating the first internal message at the first memory node is responsive to completing a search of the data subset in the local memory of the first memory node for information related to the search key.

16. The method of claim 12, further comprising comparing at the first memory node information read from the local memory of the first memory node to the search key.

17. The method of claim 12, wherein accessing the local memory of the first memory node comprises reading information stored by the local memory of the first memory node.

18. An apparatus, comprising:
a processor; and
a memory system configured to receive instructions from the processor to access information stored by the memory system; the memory system including a plurality of memory nodes, wherein each memory node of the plurality of memory nodes is coupled to at least one other memory node of the plurality of memory nodes by a communications network and each memory node of the plurality of memory nodes is configured to generate an internal message including instructions for an operation different than the instructions received from the processor, the internal message to be subsequently provided to another memory node of the plurality of memory nodes to perform the operation, wherein the other memory node subsequently generates a further internal message to forward to a subsequent one of the plurality of memory nodes.

19. The apparatus of claim 18, wherein each memory node of the plurality of memory nodes is configured to aggregate the information from other memory nodes in the plurality of memory nodes to provide to the processor in response to the received instructions.

20. The apparatus of claim 18, wherein the memory system comprises:
a first memory node of the plurality of memory nodes configured to store information in a local memory; and
a second memory node of the plurality of memory nodes coupled to the first memory node of the plurality of memory nodes and configured to receive a first message that includes a first instruction, the second memory node of the plurality of memory nodes further configured to generate a second message that includes a second instruction not included in the first message and to provide the second message to the first memory node of the plurality of memory nodes, the first memory node of the plurality of memory nodes further configured to perform a memory operation according to the second instruction.

* * * * *